United States Patent
Kim et al.

(10) Patent No.: US 9,298,209 B2
(45) Date of Patent: Mar. 29, 2016

(54) PEDAL APPARATUS FOR VEHICLE

(71) Applicants: Hyundai Motor Company, Seoul (KR); Dong Hee Industrial Co., Ltd., Ulsan (KR)

(72) Inventors: Eun Sik Kim, Gyeonggi-do (KR); Jeong Seon Min, Gwangju (KR); Yang Rae Cho, Gyeonggi-do (KR); Sung Il Lee, Gyeonggi-do (KR); Wi Sang Park, Ulsan (KR)

(73) Assignees: Hyundai Motor Company, Seoul (KR); Dong Hee Industrial Co., Ltd., Ulsan (KR)

( * ) Notice: Subject to any disclaimer, the term of this patent is extended or adjusted under 35 U.S.C. 154(b) by 250 days.

(21) Appl. No.: 13/945,306

(22) Filed: Jul. 18, 2013

(65) Prior Publication Data
US 2014/0311275 A1 Oct. 23, 2014

(30) Foreign Application Priority Data

Apr. 18, 2013 (KR) .......................... 10-2013-0043107

(51) Int. Cl.
*G05G 1/327* (2008.04)
*B60T 7/06* (2006.01)
*G05G 1/44* (2008.04)

(52) U.S. Cl.
CPC . *G05G 1/44* (2013.01); *B60T 7/065* (2013.01); *G05G 1/327* (2013.01); *Y10T 74/20528* (2015.01)

(58) Field of Classification Search
CPC .................. Y10T 74/20528; Y10T 74/20534; Y10T 74/2054; Y10T 74/20888; B60T 7/065; B60T 7/06; G05G 1/327; G05G 1/30; G05G 1/44; G05G 1/46; B60R 21/09
See application file for complete search history.

(56) References Cited

U.S. PATENT DOCUMENTS

| | | | | | |
|---|---|---|---|---|---|
| 6,006,626 | A | * | 12/1999 | Notake et al. | 74/512 |
| 6,082,219 | A | | 7/2000 | Wolpert | |
| 2003/0029267 | A1 | * | 2/2003 | Aoki et al. | 74/560 |
| 2004/0031350 | A1 | * | 2/2004 | Williams et al. | 74/560 |
| 2005/0050980 | A1 | * | 3/2005 | Park | 74/512 |
| 2008/0006119 | A1 | * | 1/2008 | Tokumo et al. | 74/560 |
| 2009/0200781 | A1 | * | 8/2009 | Hatakenaka et al. | 280/748 |
| 2010/0018617 | A1 | | 1/2010 | Wada et al. | |
| 2010/0043592 | A1 | * | 2/2010 | Johansson | 74/560 |
| 2010/0140008 | A1 | * | 6/2010 | Kim et al. | 180/271 |
| 2012/0096982 | A1 | * | 4/2012 | Blais et al. | 74/560 |
| 2014/0109399 | A1 | * | 4/2014 | Merlin et al. | 29/700 |

FOREIGN PATENT DOCUMENTS

| | | | |
|---|---|---|---|
| DE | 102007032515 A1 | * | 2/2009 |
| JP | 2005-145440 A | | 6/2005 |
| JP | 2012-083858 A | | 4/2012 |

(Continued)

*Primary Examiner* — Daniel Yabut
(74) *Attorney, Agent, or Firm* — Mintz Levin Cohn Ferris Glovsky and Popeo, P.C.; Peter F. Corless (57) ABSTRACT

A pedal apparatus for a vehicle includes a pedal bracket fixed to a dashboard, a cowl bracket fixed to a cowl panel, and a pedal arm hinge-coupled to the pedal bracket and having a reverse-swivel protrusion and a pedal on both sides of the pedal arm. Also, a reverse-swivel lever is hinge-coupled to the pedal bracket, and on an upper side of the reverse-swivel lever has an extension extending upwards and being positioned in front of the cowl bracket, and, on a lower side of the reverse-swivel lever has a reverse-swivel pin positioned below the reverse-swivel protrusion.

8 Claims, 7 Drawing Sheets

(56) References Cited

FOREIGN PATENT DOCUMENTS

| KR | 10-2006-0092054 A | 8/2006 |
|---|---|---|
| KR | 100657589 B1 | 12/2006 |
| KR | 10-2007-0009884 A | 1/2007 |
| KR | 10-2007-0010197 A | 1/2007 |
| KR | 10-2007-0053386 A | 5/2007 |
| KR | 10-2010-0014222 A | 2/2010 |
| KR | 10-2011-0063214 A | 6/2011 |
| KR | 10-2012-0062562 A | 6/2012 |

* cited by examiner

PEDAL APPARATUS FOR VEHICLE

CROSS-REFERENCE TO RELATED APPLICATION

This application claims under 35 U.S.C. §119(a) the benefit of Korean Patent Application No. 10-2013-0043107 filed on Apr. 18, 2013, the entire contents of which are incorporated herein by reference.

BACKGROUND (a) Technical Field

The present invention relates to a pedal apparatus for a vehicle which can prevent a driver from sustaining injuries during a vehicle collision.

(b) Description of the Related Art

Generally, vehicles have a variety of pedals that are required to drive the vehicles. Most of the pedals are manipulated by a driver using his or her feet, and are located on the bottom of the interior of a vehicle so as to be in the proximity of the driver's feet.

When a vehicle collision occurs, a dashboard to which the pedals are fixed is forcedly moved into the interior of a vehicle toward the driver, thereby possibly injuring the driver's ankles.

To prevent a driver from sustaining injuries due to pedals, U.S. Pat. No. 6,082,219 discloses a pedal arrangement including a bellows and a plunger rod that are connected to a brake booster, and when a vehicle is involved in a collision, a brake pedal is reversely rotated by the operation of two links including a swiveling shaft and a transmitting rod coupling the two links through a lever connected to respective rods by the swiveling shaft, thereby preventing a driver's ankles from sustaining injuries. However, such a pedal arrangement has problems in that, because a mechanically complex structure such as the two links including the swiveling shaft and transmitting rod is installed in the interior of a vehicle, the number of parts required is large, and a relatively wide space for mounting and driving the links is required.

Therefore, there is a need for a pedal apparatus for a vehicle in which the structure is simple and, when the vehicle is involved in a collision, the pedal is reversely rotated in a short time, thereby effectively preventing the driver's ankles from sustaining injuries.

The description regarding the related art is provided only for understanding of the background of the invention, so it should not be construed by ordinarily skilled persons in the art to be admitted to the related art.

SUMMARY

Accordingly, the present invention provides a pedal apparatus for a vehicle in which a structure thereof is simple so that, when the vehicle is involved in a collision, a pedal is reversely rotated in a short time, thereby effectively preventing the driver's ankles from sustaining injuries.

In order to achieve the above object, according to one aspect of the present invention, there is provided a pedal apparatus for a vehicle including: a pedal bracket fixed to an upper side of a dashboard of a vehicle; a cowl bracket fixed to a lower side of a cowl panel of a vehicle; a pedal arm rotatably hinge-coupled to the pedal bracket, the pedal arm having a reverse-swivel protrusion on an upper side of the pedal arm, the reverse-swivel protrusion protruding toward a front of the vehicle, and the pedal arm having a pedal on a lower side of the pedal arm; and a reverse-swivel lever hinge-coupled to the pedal bracket in front of the upper side of the pedal arm, and having, on an upper side of the reverse-swivel lever, an extension extending upwards and being positioned in front of the cowl bracket, and the reverse-swivel lever having a reverse-swivel pin positioned below the reverse-swivel protrusion on a lower side of the reverse-swivel lever.

The dashboard may be positioned in front of the cowl panel. Further, an upper side of the cowl bracket may be coupled to the cowl panel, and a lower side of the cowl bracket may be formed as a flange coupled to an upper surface of the pedal bracket. The flange of the cowl bracket may be provided with a recess opening, which is open toward a driver's seat of the vehicle, and a protrusion may be formed on the upper surface of the pedal bracket such that the protrusion is fitted through the recess opening of the cowl bracket and is bolted thereto. The pedal arm may have a coupling part hinge-coupled to the pedal bracket, and the pedal bracket may have an open part being open toward the driver's seat at a place where the coupling part is fixed.

The pedal apparatus may further include a fixing link having, on one side, opposite hook parts that are open downwards and surround a portion of a hinge shaft of the coupling part of the pedal arm, and on the other side, hinge holes, so that when the pedal is swiveled, the pedal arm is prevented from being separated from the open parts of the pedal bracket. The opposite hook parts of the fixing link may be connected by a connector part, which comes into close contact with the front side of the reverse-swivel lever, so that during a collision, the hook parts are swiveled upwards about the hinge holes as the reverse-swivel lever is swiveled. During a vehicle collision, the hook parts may be separated from the hinge shaft of the pedal bracket, and the hinge shaft of the pedal arm may be removed toward the driver's seat through the open parts of the pedal bracket. A bushing may be coupled to an upper side of the hook part coupled to the hinge shaft without a gap with respect to the pedal bracket, when the bushing may be made of plastic.

According to the present invention, as the dashboard is pushed back toward the interior of a vehicle during a frontal collision of the vehicle, the reverse-swivel lever may be swiveled when an extension thereof comes into contact with the cowl bracket, and the pedal arm may be swiveled when the reverse-swivel protrusion is forced by the reverse-swivel pin.

According to the present invention, when the dashboard is pushed and moved behind the interior of the vehicle during a vehicle collision, the pedal arm itself is decoupled from the pedal bracket, thereby securely protecting a driver from sustaining an injury to his or her ankles.

According to the present invention, in contrast with a pedal apparatus in the related art, the pedal apparatus of the present invention additionally includes only the reverse-swiveling lever and the fixing link, so there is no need for a large installation space, the number of parts decreases, and such an arrangement can be utilized where a reverse pushing-preventing bracket cannot typically be applied due to being disadvantageous to design layout, and thus the pedal apparatus can be mounted without modifying a design space, which reduces the cost and weight, and facilitates the assembly and maintenance thereof, and thus improves overall working efficiency.

Further, according to the present invention, the provision of the bushing normally prevents a gap from being created between the fixing link and the pedal arm and the pedal bracket, thereby restricting noise and malfunction due to the gap, increasing the strength of the pedal apparatus, and ensuring the reliability of operation. Also, the bushing serves as a fail-safe safety device that prevents the hinge shaft of the hinge coupling part of the pedal arm from being decoupled through the opening, together with the fixing link.

Therefore, the pedal apparatus allows for a safe operation during a normal operation, and during a vehicle collision, the pedal arm is reversely swiveled and is completely decoupled from the pedal bracket, thereby providing the effect of securely protecting a driver from sustaining an injury to his or her ankles.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
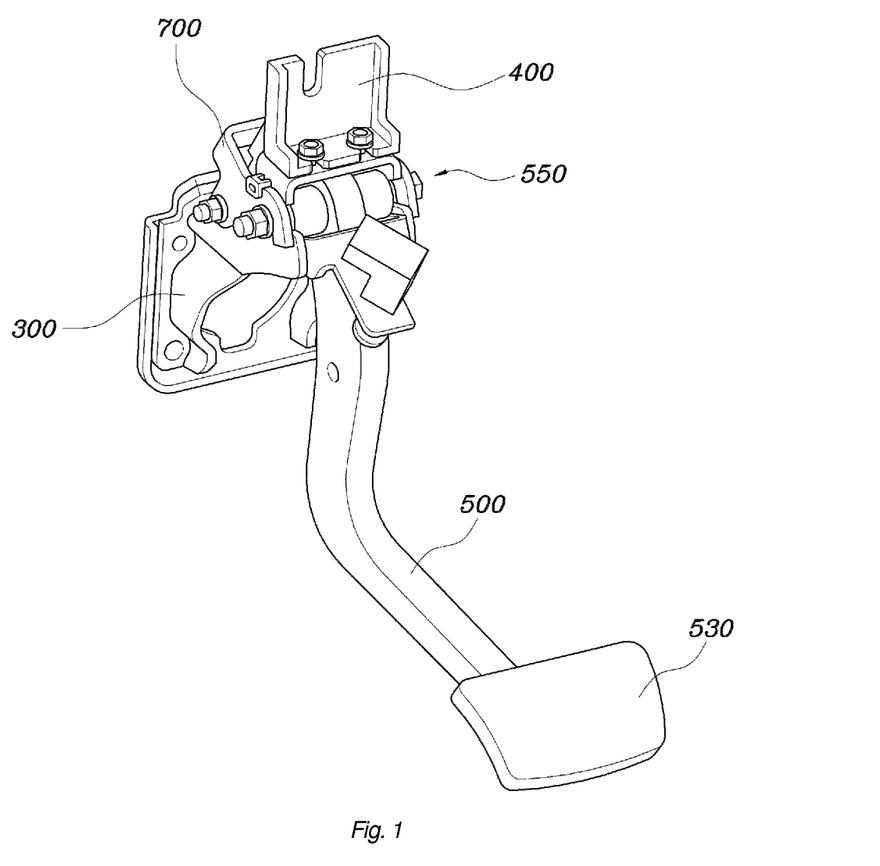
FIG. 1 is a front perspective view of a pedal apparatus for a vehicle according to an embodiment of the present invention.
Figure 2:
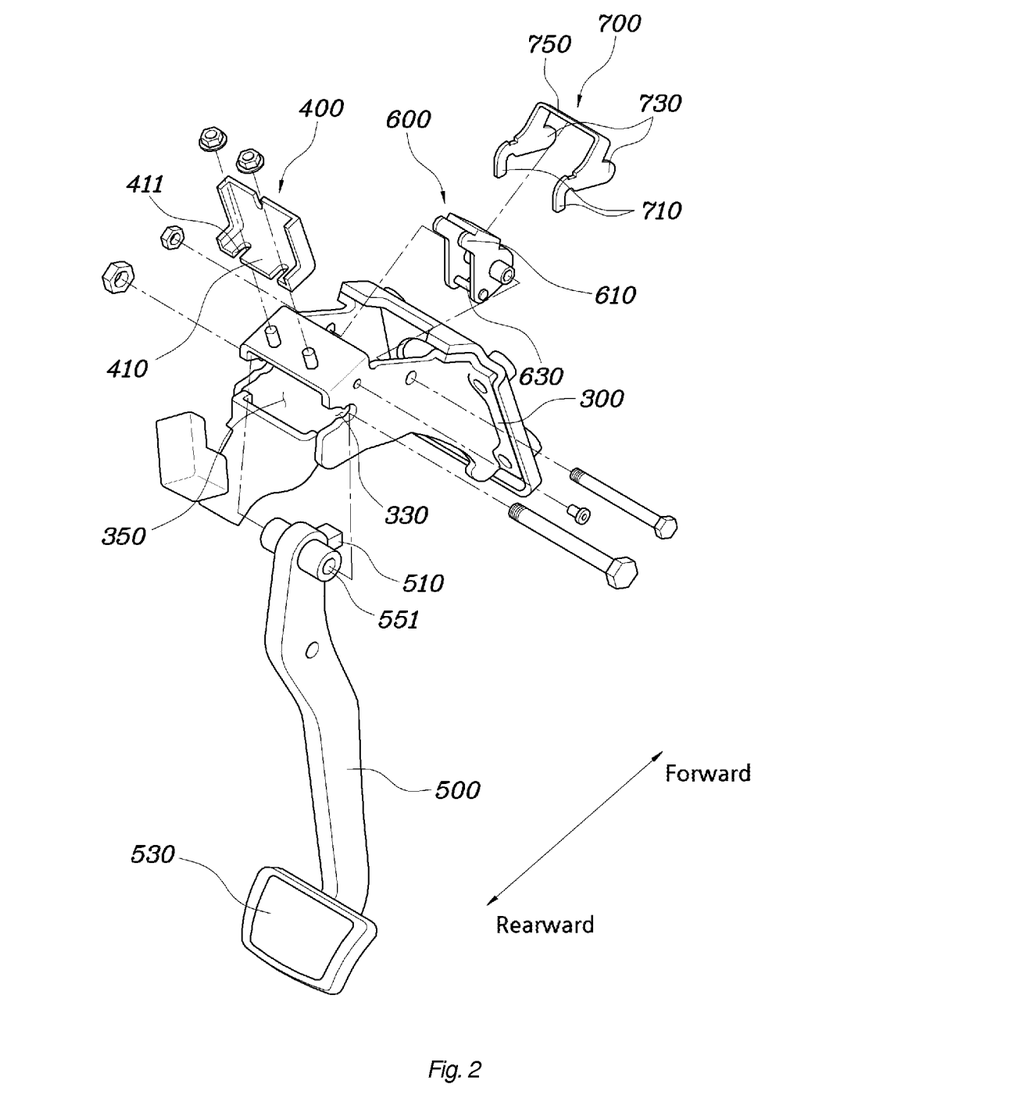
FIG. 2 is an exploded parts view of the pedal apparatus of FIG. 1.
Figure 3:
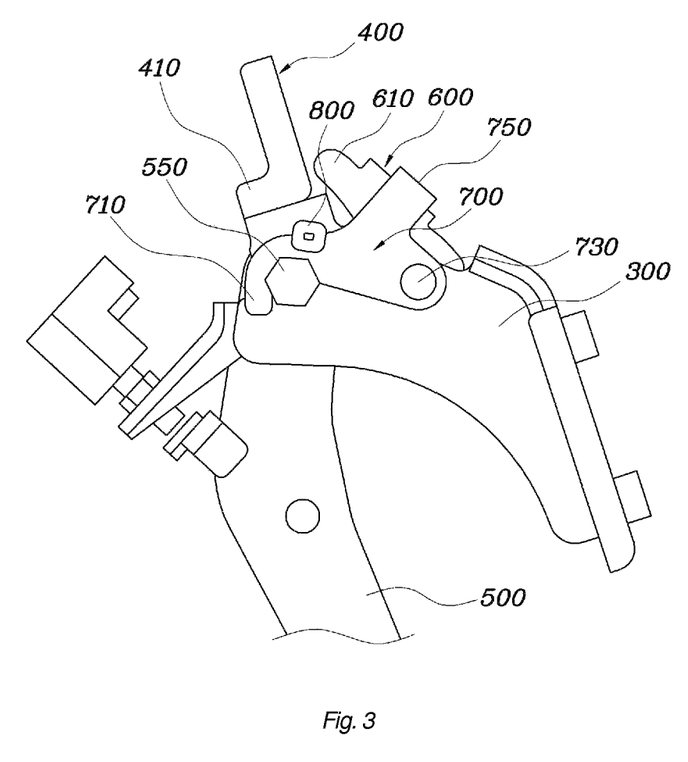
FIG. 3 is a partial side perspective view of the pedal apparatus of FIG. 1.
Figure 4:
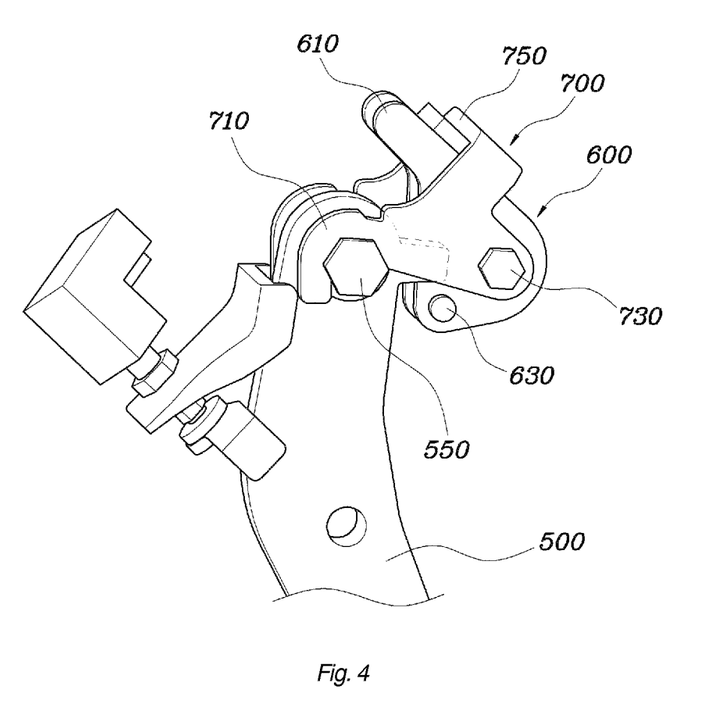
FIG. 4 is a detailed view of a coupling section of the pedal apparatus of FIG. 3.

FIG. 1 is a view of a pedal apparatus for a vehicle according to an embodiment of the present invention. Also, FIG. 2 is an exploded parts view of the pedal apparatus of FIG. 1, and FIGS. 3-4 are side views of the pedal apparatus of FIG. 1.

The pedal apparatus for a vehicle includes a pedal bracket 300 which is fixed to an upper side of a dashboard 100 of a vehicle, a cowl bracket 400 which is fixed to a lower side of a cowl panel 200 of the vehicle, a pedal arm 500 which is rotatably hinge-coupled to the pedal bracket 300 and has a reverse-swivel protrusion 510 on an upper side of the pedal arm 500, the reverse-swivel protrusion 510 protruding toward a front of the vehicle, and a pedal 530 on a lower side of the pedal arm 500, and a reverse-swivel lever 600 which is hinge-coupled to the pedal bracket 300 in front of the upper side of the pedal arm 500, the reverse-swivel lever 600 having, on an upper side of the reverse-swivel lever 600, an extension 610 which extends upwards and is positioned in front of the cowl bracket 400, and a reverse-swivel pin 630 which is positioned below the reverse-swivel protrusion 510 on a lower side of the reverse-swivel lever 600. The dashboard 100 is positioned in front of the cowl panel 200.

The pedal apparatus of the present invention is provided in the proximity of the dashboard 100 and the cowl panel 200 such that the pedal bracket 300 is fixed to the dashboard 100. The pedal arm 500 is hinge-coupled to the pedal bracket 300 at a coupling part 550, and the reverse-swivel protrusion 510 is formed at the front side of the coupling part 550.

The reverse-swivel protrusion 510 is a means for reverse-swiveling the pedal arm 500. When a vehicle collision occurs, the extension 610 of the reverse-swivel lever 600 comes into contact with the cowl bracket 400 so that the reverse-swivel pin 630 is swiveled up to lift the reverse-swivel protrusion 510, and thus reverse-swivel the pedal arm 500. The reverse-swivel protrusion 510 is formed below the reverse-swivel pin 630, because it needs to be lifted by the reverse-swivel pin 630 of the reverse-swivel lever 600.

The pedal bracket 300 has opposite open parts 330 which are open toward a driver's seat and to which the coupling part 550 is fixed. The open parts 330 are a portion of a circumference of the pedal bracket 300, to which the coupling part 550 is fixed, and a large opening 350 is formed between the opposite open parts 330 at the front side of the pedal bracket 300. When hinge-coupled to the open parts, the coupling part 550 is introduced into the open parts through the large opening 350 from a lower side toward an upper side thereof.

Since the pedal arm 500 should be separated from the pedal bracket during a vehicle collision by a hinge shaft 551 being separated from the open parts 330, the pedal bracket 300 has the large opening 350. Further, during normal operation, the pedal arm should not be separated from the pedal bracket, so a fixing link 700 is further attached to the pedal bracket 300.

The fixing link 700 has, on one side, opposite hook parts 710 that are open downwards and surround a portion of the hinge shaft 551 of the coupling part 550 of the pedal arm 500, and on the other side, hinge holes 730. As a result, when the pedal 530 is swiveled, the pedal arm is prevented from being separated from the open parts of the pedal bracket 300. The hinge holes 730 of the fixing link 700 are formed in front of the opposite hook parts 710, and the fixing link 700 is integrally coupled to the pedal bracket 300 through the reverse-swivel lever 600 and the hinge holes 730. The opposite hook parts 710 of the fixing link 700 are connected by a connector part 750, which comes into close contact with the front side of the reverse-swivel lever 600. During a collision, the hook parts 710 are swiveled upwards about the hinge holes 730 as the reverse-swivel lever 600 is swiveled, so that the hook parts 710 are separated from the hinge shaft 551 of the pedal arm 500, and then the hinge shaft 551 of the pedal arm 500 is removed toward the driver's seat through the open parts 330 of the pedal bracket 300.

In normal operation, the reverse-swivel pin 630 of the reverse-swivel lever 600 and the reverse-swivel protrusion 510 of the pedal arm 500 are spaced by a certain distance and do not interfere with each other, having no influence on the manipulation and operation of the pedal 530. However, during a collision, the reverse-swivel lever 600 is swiveled to cause the reverse-swivel pin 630 to swivel the reverse-swivel protrusion 510 of the pedal arm 500 and therefore reverse-swivel the pedal arm itself.

To prevent the pedal arm 500 from being separated from the pedal bracket 300 during normal operation, the fixing link 700 is placed around the pedal arm such that the hook parts 710 surround the hinge shaft 551, and bushings 800 are fixedly mounted to the upper sides of the hook parts 710 of the fixing link 700. Each bushing 800 serves to prevent a gap from being created between the fixing link 700, the pedal arm 500, and the pedal bracket 300, thereby preventing noise and malfunctioning due to the gap, improving the strength of the pedal apparatus, and ensuring reliability of operation of the pedal apparatus. Further, the bushing serves as a fail-safe safety device, together with the fixing link 700, in order to prevent the hinge shaft 551 of the coupling part 550 of the pedal arm 500 from being separated through the opening 350.

During a collision, the bushings 800 are broken by the hook parts 710 of the fixing link 700, so when the reverse-swivel lever 600 is swiveled, the connector part 750 of the fixing link 700 is swiveled so that the hook parts 710 are lifted upwards. The bushing 800 is generally made from a soft material compared to the hook part 710. For example, the hook part 710 may be made from steel, and the bushing 800 may be made from plastic.

The cowl bracket 400 may have a variety of shapes, and may adopt an "L"-shape in a preferred embodiment of the present invention. An upper side of the cowl bracket 400 is coupled to the cowl panel 200, and a lower side thereof is formed as a flange 410 that is coupled to an upper surface of the pedal bracket 300. The flange 410 of the cowl bracket 400 is provided with recess openings 411, which are open toward the driver's seat, and protrusions 310 are formed on the upper surface of the pedal bracket 300 such that the protrusions are fitted through the recess openings 411 of the cowl bracket 400 and are bolted thereto.

Thus, when the dashboard 100 is pushed toward the driver's seat during a vehicle collision, the pedal bracket 300 fixed to the dashboard 100 is also moved, together with the dashboard 100, such that the cowl panel 200 and the cowl bracket 400 are moved less than the pedal bracket, so the protrusions 310 of the pedal bracket 300 slide off along the recess openings 411 of the flange 410, thereby allowing the pedal bracket 300 to be easily separated from the cowl bracket 400.

A hinge-coupling part between the fixing link 700 and the reverse-swivel lever 600 is positioned in front of the coupling part 550 of the pedal arm 500, and the reverse-swivel pin 630 is positioned below the reverse-swivel protrusion 510. Thus, during a collision, the reverse-swivel pin 630 is swiveled about the hinge-coupling part between the fixing link 700 and the reverse-swivel lever 600 to cause the reverse-swivel protrusion 510 of the pedal arm 500 to be forced upwards.

As compared to the conventional pedal apparatus, since the pedal apparatus of the present invention additionally includes only the reverse-swivel lever and the fixing link, there is no need for a large space and the number of parts required decreases, so the pedal apparatus can be easily mounted without modifying a design space, thus providing an advantage of reduced cost and weight.

Figure 5:
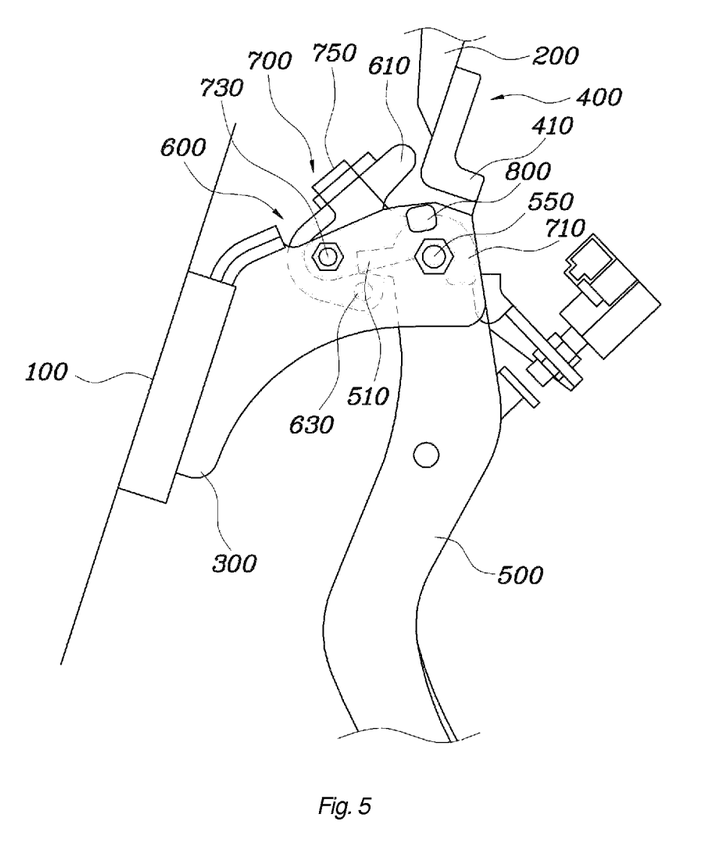
FIG. 5 is a schematic view of the pedal apparatus of FIG. 3 in a normal state.
Figure 6:
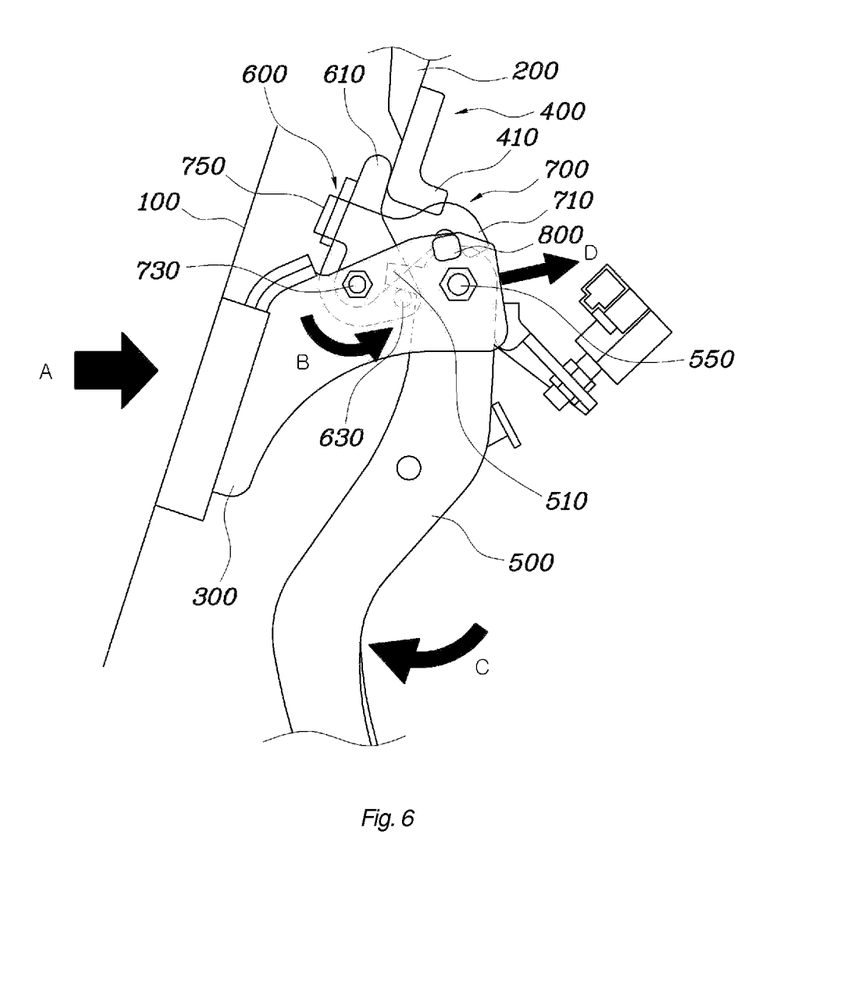
FIG. 6 is a schematic view of the pedal apparatus of FIG. 3 after a collision occurs.

FIG. 5 is a view of the pedal apparatus in a normal state, and FIG. 6 is a view of the pedal apparatus after a collision occurs.

As shown in FIG. 5, in a normal state, when a driver steps on the pedal 530, the pedal is normally swiveled back and forth about the coupling part 550. However, during a frontal collision, as the dashboard 100 is pushed toward the interior of a vehicle, the reverse-swivel lever 600 is swiveled when the extension 610 comes into contact with the cowl bracket 400, and then the pedal arm 500 is swiveled when the reverse-swivel protrusion 510 is forced by the reverse-swivel pin 630. This operation is shown in FIG. 6.

During a collision, specifically, force is exerted in the direction of the arrow A, and the dashboard 100 is pushed back further than the cowl panel 200 so that the pedal bracket 300 is moved back together with the dashboard 100. Here, the protrusions 310 of the pedal bracket 300 slide off along the recess openings 411 of the cowl bracket 400, so that the pedal bracket 300 is separated from the cowl bracket 400. As the pedal bracket 300 is pushed back, the reverse-swivel lever 600 comes into contact with the cowl bracket 400 so that the pedal bracket 300 and the reverse-swivel lever 600 are swiveled in the direction of the arrow B about the hinge-coupling part therebetween. Then, when the reverse-swivel lever 600 is swiveled about the hinge holes 730, the reverse-swivel pin 630 forces the reverse-swivel protrusion 510 of the pedal arm 500 to be lifted upwards, and at the same time, the reverse-swivel lever 600 forces the connector part 750 of the fixing link 700 to allow the fixing link 700 to be swiveled about the hinge holes 730 so that the hook parts 710 of the fixing link 700 are lifted upwards while breaking the bushings 800. With the swiveling of the reverse-swivel lever 600 and the fixing link 700 in the direction of the arrow B, the pedal arm 500 is reverse-swiveled in the direction of the arrow C, and then at the same time, the hinge shaft 551 is separated from the hook parts 710 of the fixing link 700 and then is removed in the direction of the arrow D through the open parts 330 so that the coupling part 550 is moved back to cause the pedal arm 500 to be further reverse-swiveled.

Therefore, the pedal apparatus allows for a safe operation during a normal operation, and during a vehicle collision, the pedal arm is reversely swiveled and is completely decoupled from the pedal bracket, thereby providing the effect of securely protecting a driver from sustaining an injury to his or her ankles. Further, the pedal apparatus can be utilized in an arrangement when a reverse pushing-preventing bracket cannot typically be applied due to a disadvantageous design layout, and has a decreased number of parts, thus saving on cost and weight, and facilitating assembly and maintenance, in order to improve working efficiency.

Figure 7:
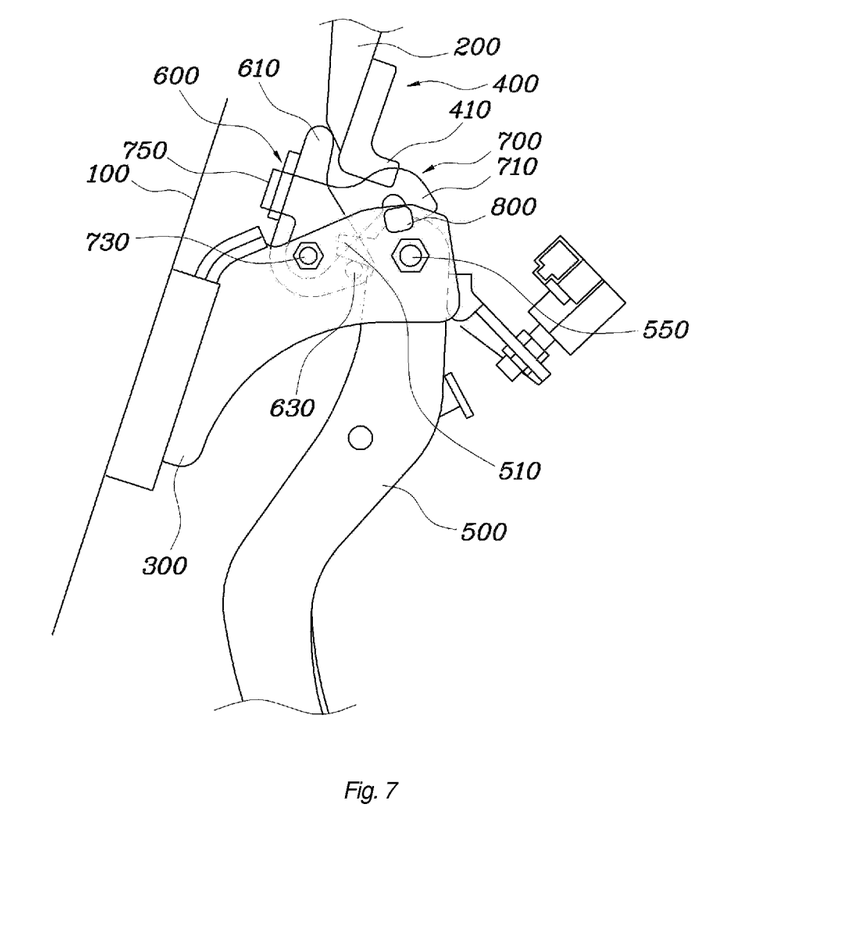
FIG. 7 is a view of a pedal apparatus for a vehicle according to another embodiment of the present invention.

FIG. 7 is a view of a pedal apparatus for a vehicle according to another embodiment of the present invention, when during a collision, the extension 610 of the reverse-swivel lever 600 is swiveled while coming into contact with the cowl panel 200, instead of the cowl bracket 400. In the case where the cowl panel 200 is designed to be longer, even when the extension 610 of the reverse-swivel lever 600 comes into contact with the cowl panel 200, instead of the cowl bracket 400, and is swiveled, the swiveling action is the same as that of the case when the extension comes into contact with the cowl bracket 400 and is swiveled so that the pedal arm 500 is reversely swiveled and completely separated likewise from the pedal bracket 300.

Therefore, during a vehicle collision, although the dashboard is pushed back, the pedal arm itself is separated from the pedal bracket, thereby providing the effect of securely protecting a driver from sustaining an injury to his ankle.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pedal apparatus for a vehicle, comprising:
a pedal bracket fixed to an upper side of a dashboard of the vehicle;
a cowl bracket fixed to a lower side of a cowl panel of the vehicle;
a pedal arm rotatably hinge-coupled to the pedal bracket, the pedal arm having a reverse-swivel protrusion on an upper side of the pedal arm, the reverse-swivel protrusion protruding toward a front of the vehicle, and the pedal arm having a pedal on a lower side of the pedal arm, wherein the pedal arm has a coupling part hinge-coupled to the pedal bracket, and the pedal bracket has an open part being open toward a driver's seat of the vehicle at a place where the coupling part is fixed;
a reverse-swivel lever hinge-coupled to the pedal bracket in front of the upper side of the pedal arm, the reverse-swivel lever having, on an upper side of the reverse-swivel lever, an extension extending upwards and being positioned in front of the cowl bracket, and the reverse-swivel lever having a reverse-swivel pin positioned below the reverse-swivel protrusion on a lower side of the reverse-swivel lever; and
a fixing link having, on one side, opposite hook parts that are open downwards and surround a portion of a hinge shaft of the coupling part of the pedal arm, and on another side, hinge holes, so that when the pedal is swiveled, the pedal arm is prevented from being separated from the open part of the pedal bracket, wherein a bushing is coupled to an upper side of the hook part coupled to the hinge shaft without a gap with respect to the pedal bracket.

2. The pedal apparatus according to claim 1, wherein the dashboard is positioned in front of the cowl panel.

3. The pedal apparatus according to claim 1, wherein an upper side of the cowl bracket is coupled to the cowl panel, and a lower side of the cowl bracket is formed as a flange coupled to an upper surface of the pedal bracket.

4. The pedal apparatus according to claim 3, wherein the flange of the cowl bracket is provided with a recess opening, which is open toward a driver's seat of the vehicle, and a protrusion is formed on the upper surface of the pedal bracket such that the protrusion is fitted through the recess opening of the cowl bracket and is bolted thereto.

5. The pedal apparatus according to claim 1, wherein the opposite hook parts of the fixing link are connected by a connector part, which comes into contact with the front side of the reverse-swivel lever, so that during a collision, the hook parts are swiveled upwards about the hinge holes as the reverse-swivel lever is swiveled.

6. The pedal apparatus according to claim 1, wherein during a vehicle collision, the hook parts are separated from the hinge shaft of the pedal arm, and the hinge shaft of the pedal arm is removed toward the driver's seat through the open part of the pedal bracket.

7. The pedal apparatus according to claim 1, wherein the bushing is made from plastic.

8. The pedal apparatus according to claim 1, wherein as the dashboard is pushed back toward the interior of a vehicle during a frontal collision of the vehicle, the reverse-swivel lever is swiveled when an extension thereof comes into contact with the cowl bracket, and the pedal arm is swiveled when the reverse-swivel protrusion is forced by the reverse-swivel pin.

* * * * *